United States Patent
Lindoff et al.

(10) Patent No.: US 9,860,008 B2
(45) Date of Patent: Jan. 2, 2018

(54) CHANNEL ESTIMATION FOR INTERFERENCE CANCELLATION

(71) Applicant: Telefonaktiebolaget L M Ericsson (publ), Stockholm (SE)

(72) Inventors: Bengt Lindoff, Bjarred (SE); Joakim Axmon, Kavlinge (SE); Torgny Palenius, Barseback (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 156 days.

(21) Appl. No.: 14/768,225

(22) PCT Filed: Mar. 6, 2013

(86) PCT No.: PCT/EP2013/054464
§ 371 (c)(1),
(2) Date: Aug. 15, 2015

(87) PCT Pub. No.: WO2014/135204
PCT Pub. Date: Sep. 12, 2014

(65) Prior Publication Data
US 2016/0006528 A1  Jan. 7, 2016

(51) Int. Cl.
H04J 11/00 (2006.01)
H04L 25/02 (2006.01)

(52) U.S. Cl.
CPC ......... *H04J 11/005* (2013.01); *H04J 11/0069* (2013.01); *H04J 11/0079* (2013.01);
(Continued)

(58) Field of Classification Search
None
See application file for complete search history.

(56) References Cited

U.S. PATENT DOCUMENTS

2003/0012270 A1   1/2003   Zhou et al.
2003/0193926 A1*  10/2003  Lindoff .............. H04B 1/70755
                                                  370/350

(Continued)

FOREIGN PATENT DOCUMENTS

EP    1569355 A2   8/2005
EP    2369874 A1   9/2011

(Continued)

OTHER PUBLICATIONS

PCT International Search Report, dated Dec. 19, 2013, in connection with International Application No. PCT/EP2013/054464, all pages.

(Continued)

*Primary Examiner* — Faruk Hamza
*Assistant Examiner* — Cassandra Decker
(74) *Attorney, Agent, or Firm* — Leffler Intellectual Property Law, PLLC

(57) ABSTRACT

A method of a wireless communication device for a cellular communication system is disclosed. According to the method, a signal comprising a first known signal sequence and a second known signal sequence for each of one or more first cells of the cellular communication system is received, and the first and second known signal sequences of each of the one or more first cells are detected based on the received signal. For at least one of the one or more first cells, one of the first known signal sequence, the second known signal sequence, and a combination of the first and second known signal sequences is selected for channel estimation. The selection is based on the detected first and second known signal sequences of the one or more cells. Channel estimation of the at least one of the one or more first cells is performed based on the signal sequence selection. In some examples, the method may further comprise performing (Continued)

interference cancellation of at least one of the first and second known signal sequences of the at least one of the one or more first cells based on the channel estimation and detecting one or more second cells of the cellular communication system after the interference cancellation. Corresponding computer program product, arrangement and wireless communication device are also disclosed.

16 Claims, 3 Drawing Sheets

(52) U.S. Cl.
CPC ...... *H04J 11/0086* (2013.01); *H04L 25/0204* (2013.01); *H04L 25/0224* (2013.01); *H04J 2211/001* (2013.01); *H04J 2211/005* (2013.01); *H04L 25/0206* (2013.01)

(56) References Cited

U.S. PATENT DOCUMENTS

| | | | |
|---|---|---|---|
| 2010/0003992 A1* | 1/2010 | Cao | H04J 11/0076 455/446 |
| 2010/0272034 A1* | 10/2010 | Imai | H04B 1/70735 370/329 |
| 2011/0195684 A1* | 8/2011 | Zhang | H04B 1/7107 455/226.1 |
| 2012/0172041 A1* | 7/2012 | Krishnamurthy | H04J 11/005 455/436 |
| 2012/0231790 A1 | 9/2012 | Lindoff et al. | |
| 2013/0128877 A1* | 5/2013 | Reddy | H04J 11/004 370/350 |
| 2013/0279419 A1* | 10/2013 | Li | H04W 24/02 370/328 |

FOREIGN PATENT DOCUMENTS

| | | | |
|---|---|---|---|
| JP | WO 2012108155 A1 * | 8/2012 | ............ H04W 24/02 |
| WO | 0055992 A1 | 9/2000 | |
| WO | 2005018111 A1 | 2/2005 | |
| WO | 2010000654 A1 | 1/2010 | |
| WO | 2011022404 A2 | 2/2011 | |
| WO | 2011066325 A1 | 6/2011 | |
| WO | 2011075698 A1 | 6/2011 | |
| WO | 2011130451 A1 | 10/2011 | |
| WO | 2012121660 A1 | 9/2012 | |

OTHER PUBLICATIONS

PCT Written Opinion, dated Dec. 19, 2013, in connection with International Application No. PCT/EP2013/054464, all pages.
PCT International Preliminary Report on Patentability, dated Sep. 17, 2015, in connection with International Application No. PCT/EP2013/054464, all pages.
Jiann-Ching Guey et al., Improving the Robustness of Target Cell Search in WCDMA Using Interference Cancellation, 2005 International Conference on Wireless Networks, Communications and Mobile Computing, Maui, HI, USA Jun. 13-16, 2005,—Jun. 13, 2005; Jun. 13, 2005-Jun. 16, 2005—Piscataway, NJ, USA,IEEE, 2, pgs. 879-883.

* cited by examiner

CHANNEL ESTIMATION FOR INTERFERENCE CANCELLATION

TECHNICAL FIELD

The present invention relates generally to the field of channel estimation for wireless communication devices. More particularly, it relates to channel estimation suitable for interference cancellation in cell search procedures of heterogeneous networks.

BACKGROUND

Improved support for heterogeneous network operations is part of the currently ongoing specification work for 3GPP LTE ($3^{rd}$ Generation Partnership Project—Long term Evolution). A heterogeneous network deployment may comprise a mixture of cells having differently sized and/or overlapping coverage areas. One object of heterogeneous network deployment (e.g. deploying low power network nodes, such as pico base stations, within a coverage area of a macro (high power) network node) is to improve system capacity. This may be achieved by cell splitting gains. Another object of heterogeneous network deployment is to provide users with very high speed data access throughout (a large portion of) the network. Heterogeneous network deployments where traffic hotspots (i.e. small geographical areas with high user density) are served by low power cells (e.g. pico cells) are particularly effective.

FIG. 1 illustrate an example heterogeneous network deployment with first and second macro cells controlled by first and second network nodes 10, 20 respectively and one pico cell controlled by a third network node 30. In the example of FIG. 1, a wireless communication device 40 is in an area where the first and second macro cells and the pico cell overlap. Possible signal transfer between the wireless communication device 40 and the first network node 10 is illustrated by the dashed arrow 11, possible signal transfer between the wireless communication device 40 and the second network node 20 is illustrated by the dashed arrow 21, and possible signal transfer between the wireless communication device 40 and the third network node 30 is illustrated by the dashed arrow 31.

A pico node is only one example of a low power node that may be deployed in a heterogeneous network. Other examples of low power nodes suitable for a heterogeneous network deployment include home base stations and relays.

Different network node types of a heterogeneous network may have large differences in output power levels. For example, a macro network node may have an output power of 46 dBm while a pico network node may have an output power of less than 30 dBm. Due to the variation in output power among different network node types of a heterogeneous network, some approaches applicable in homogeneous networks may no longer be suitable as will be seen in the following. For example, the interference situation may differ substantially which affects cell search results and re-selection/handover decisions.

The different layers (e.g. macro and pico layers) of a heterogeneous network may operate on the same of different carrier frequencies.

When frequency separation between layers is applied, interference between layers is avoided and cell splitting gain may be achieved when, for example, all available resources are used simultaneously by a lower layer (e.g. pico) cell. However, inefficient resource utilization may result when, for example, there is low activity in a lower layer (e.g. pico) cell. In such a situation it would be beneficial to be able to utilize the lower layer resources in the higher layer cells, but that is not possible in a static frequency separation approach.

When the same carrier frequency (or carrier frequencies) is used across layers there is typically some type of transmission coordination between the layers to avoid several layers trying to access a same radio resource. This type of coordination is often referred to as inter-cell interference coordination (ICIC). Depending on the traffic situation on different layers, the radio resource distribution may be dynamic over time which allows efficient resource utilization in contrast to the frequency separation approach. To ensure efficiency and accuracy of ICIC across layers, time synchronization between network nodes of different layers is typically required.

When a wireless communication device (e.g. the wireless communication device 40 of FIG. 1) is turned on, it performs a cell search procedure to determine which cells are close enough for it to communicate with and also to determine which of the found cells to select for communication. A cell search is also typically performed repeatedly while the wireless communication device is connected to a network to discover new cells appearing due to mobility and/or changing radio conditions and to be able to adequately determine whether or not to change to another cell (e.g. handover and re-selection). Cell search and related procedures are well known in the art and will not be elaborated on in detail herein.

A typical component of a cell search procedure comprises reception and detection of one or more known signal sequences transmitted (e.g. broadcast) by the particular network node. In LTE for example, the known signal sequences comprise the primary synchronization signal (PSS) and the secondary synchronization signal (SSS). Each cell has a PSS selected from an ensemble of possible PSS:s and an SSS selected from an ensemble of possible SSS:s (in fact, the SSS consists of two concatenated SSS parts, each of which are selected from an ensemble of possible SSS parts). Together, the PSS and SSS of a cell define the Physical Cell Identity (PCI) of that cell.

Due to the variation in output power among different network node types of a heterogeneous network high power network nodes may provide very strong interference to reception of signals from low power network nodes. For example, a pico network node may have a power level that is between −12 dB and −15 dB compared to the power level of a macro network node. Furthermore, the time synchronization between layers may result in that the known signal sequences for network nodes of different layers are transmitted simultaneously. This may result in that a low power network node may not be detected even if the wireless communication device is very close to the low power network node. In 3GPP UMTS LTE specifications up to Rel. 10 for example, cell search is typically not carried out below a power level between −8 and −10 dB below the currently strongest cell.

In the example of FIG. 1, synchronization signals transmitted by the macro network nodes 10, 20 may drown a synchronization signal transmitted by the pico network nodes 30 when the signals are received by the wireless communication device 40 even though the wireless communication device is substantially closer to the pico network node 30 than any of the macro network nodes 10, 20.

One way of solving this problem is to introduce interference cancellation (of the known signal sequences) of one or more of the stronger (already detected) cells to be able to find weaker cells by cell searching the interference cancelled signal. Example interference cancellation approaches used in connection with cell search for heterogeneous networks are disclosed in WO2012/121660A1 and in WO2010/000654A1.

However, when the channel estimation used for the interference cancellation is not accurate enough, the interference cancellation itself may be erroneous or at least sub-optimal and the weaker cells may still not be found. The channel estimation for one high power network node (e.g. node 10 of FIG. 1) may, for example, be inaccurate if the known signal used for channel estimation experiences large interference from another high power network node (e.g. node 20 of FIG. 1).

Therefore, there is a need for methods and arrangements for robust channel estimation. Particularly, there is a need for such methods and arrangements that are suitable for interference cancellation in cell search procedures of heterogeneous networks.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements for robust channel estimation.

According to a first aspect, this is achieved by a method of a wireless communication device for a cellular communication system. The method comprises receiving a signal comprising a first known signal sequence and a second known signal sequence for each of one or more first cells of the cellular communication system, and detecting the first and second known signal sequences of each of the one or more first cells based on the received signal.

The method also comprises (for at least one of the one or more first cells and based on the detected first and second known signal sequences of the one or more cells) selecting one of the first known signal sequence, the second known signal sequence, and a combination of the first and second known signal sequences for channel estimation, and performing channel estimation of the at least one of the one or more first cells based on the signal sequence selection.

The first and second known signal sequences may together define a cell identity according to some embodiments. The first and second known signal sequences may be a first and second synchronization signal such as, for example, a primary synchronization signal (PSS) and a secondary synchronization signal (SSS) respectively of the Universal Mobile Telecommunication Standard—Long Term Evolution (UMTS LTE). The cell identity may, for example be a Physical Cell Identity (PCI) of UMTS LTE.

The signal sequence selection may be further based on any suitable signal quality measure of the one or more cells (e.g. signal-to-noise ratio (SNR), signal-to-interference ratio (SIR), signal-to-interference-and-noise ratio (SINR), signal strength, reference signal received power (RSRP), reference signal received quality (RSRQ), etc.).

According to some embodiments, the one or more first cells comprise two or more first cells.

In some embodiments, the one or more first cells consist of two first cells.

According to some embodiments, the method may further comprise performing interference cancellation, on the received signal, of at least one of the first and second known signal sequences of the at least one of the one or more first cells based on the channel estimation to produce an interference cancelled received signal. In the example of UMTS LTE, the method may comprise cancelling either only the secondary synchronization signal or both of the primary synchronization signal and the secondary synchronization signal.

The method may also, in some embodiments, comprise detecting one or more second cells of the cellular communication system based on the interference cancelled received signal. The detection may comprise detecting a first known signal sequence and a second known signal sequence for the second cell, comprised in the received signal.

In some embodiments, the method may further comprise determining that interference cancellation is required prior to performing interference cancellation. The determination that interference cancellation is required may be performed at any suitable time before performing interference cancellation, for example, after receiving the signal and prior to performing the sequence selection. The determination that interference cancellation is required may, for example, be based on signaling from a network node (e.g. explicit signaling indicating that interference cancellation is required or implicit signaling, e.g. configuration signaling such as a measurement pattern indicating that a second (low power) cell may be present). Alternatively or additionally, the determination that interference cancellation is required may be based on a user equipment (UE) capability of the wireless communication device.

The method may, according to some embodiments, further comprise determining, based on the detected first and second known signal sequences of the one or more first cells how many cells the at least one of the one or more first cells comprises and which cells the at least one of the one or more first cells comprises. This determination may, in some embodiments, be further based on any suitable signal quality measure of the one or more cells (e.g. signal-to-noise ratio (SNR), signal-to-interference ratio (SIR), signal-to-interference-and-noise ratio (SINR), signal strength, reference signal received power (RSRP), reference signal received quality (RSRQ), etc.).

According to some embodiments, the method may further comprise determining one or more signal properties associated with a cell identity (comprising, for example, the cell identity) of the at least one of the one or more first cells based on the detected first and second known signal sequences. The selection for channel estimation (and/or the determination of how many and which the at least one of the one or more first cells comprises) may be performed based on the determined one or more signal properties associated with cell identity. The cell identity may, for example be a Physical Cell Identity (PCI) of UMTS LTE.

According to some embodiments, performing the channel estimation of the at least one of the one or more first cells based on the combination of the first and second known signal sequences may comprise determining the channel estimation as a sum of a channel estimation based on the first known signal sequence multiplied with a first weighting factor and a channel estimation of the second known signal sequence multiplied with a second weighting factor, wherein the first and second weighting factors are larger than zero.

In some embodiments, the weighting factors may be larger than zero and smaller than one. In some embodiments, a sum of the weighting factors may be equal to one. In other embodiments, a sum of the weighting factors may have any positive value.

According to some embodiments, the combination of the channel estimates based the first and second known signal sequences may be expressed as $a\hat{H}_1+(1-a)\hat{H}_2$, where $0<a<1$ is the first weighting factor, $(1-a)$ is the second weighting factor and $\hat{H}_1$ and $\hat{H}_2$ are the channel estimates based on the first and second known signal sequences respectively.

Selecting one of the first known signal sequence, the second known signal sequence, and a combination of the first and second known signal sequences for channel estimation may, according to some embodiments, comprise determining one or more correlation values between the known signal sequences of the at least one cell and corresponding known signal sequences of the other ones of the one or more first cells, comparing each of the one or more correlation values to one or more correlation value thresholds, and performing the selection for channel estimation based on the comparison. The correlation values may, for example, comprise scalar products between the known signal sequences in question (or between parts of the known signal sequences in question). A correlation value threshold may comprise an absolute threshold value or another one of the correlation values (possibly after normalization). In a typical example, if the correlation values associated with the first known signal sequence are higher than the correlation values associated with the second known signal sequence, then the second known signal sequence should be selected for channel estimation for that cell and vice versa. For cases where the correlation values of the first and second known signal sequences are close to each other and/or where it differs between pairs of cells which of the correlation value is highest, a combination (with a weighting factor minimizing the correlation) of the first and second known signal sequences may be selected for channel estimation.

Selecting one of the first known signal sequence, the second known signal sequence, and a combination of the first and second known signal sequences for channel estimation may, according to some embodiments, comprise accessing a look-up-table for each of the at least one of the one or more first cells. Typically, particulars (e.g. the first and second known signal sequences and/or the cell identity) of the at least one cell may be input to the look-up-table together with corresponding particulars for the other ones of the one or more first cells and the sequence selection (including possible weighting factors) may be output from the look-up table. The table may be constructed using similar considerations regarding correlation between sequences as explained above.

A second aspect is a computer program product comprising a computer readable medium, having thereon a computer program comprising program instructions. The computer program is loadable into a data-processing unit and is adapted to cause execution of the method according to the first aspect when the computer program is run by the data-processing unit.

According to a third aspect, an arrangement of a wireless communication device for a cellular communication system is provided. The arrangement comprises a receiver, a cell detector, a sequence selector and a channel estimator.

The receiver is adapted to receive a signal comprising a first known signal sequence and a second known signal sequence for each of one or more first cells of the cellular communication system.

The cell detector is adapted to detect the first and second known signal sequences of each of the one or more first cells based on the received signal.

The sequence selector is adapted to, for at least one of the one or more first cells and based on the detected first and second known signal sequences of the one or more cells, select one of the first known signal sequence, the second known signal sequence, and a combination of the first and second known signal sequences for channel estimation.

The channel estimator is adapted to perform channel estimation of the at least one of the one or more first cells based on the signal sequence selection.

According to some embodiments, the arrangement may further comprise an interference canceller adapted to perform interference cancellation, on the received signal, of at least one of the first and second known signal sequences of the at least one of the one or more first cells based on the channel estimation to produce an interference cancelled received signal.

The cell detector may, in some embodiments, be further adapted to detect one or more second cells of the cellular communication system based on the interference cancelled received signal.

The arrangement may, according to some embodiments, further comprise an interference cancellation controller adapted to determine that interference cancellation is required. Alternatively or additionally, the interference cancellation controller may be adapted to determine (based on the detected first and second known signal sequences of the one or more first cells) how many cells the at least one of the one or more first cells comprises and which cells the at least one of the one or more first cells comprises.

The sequence selector may comprise a mapper and a memory providing a look-up table function. Alternatively, the sequence selector may comprise a correlator adapted to determine (for each of the at least one of the one or more first cells) one or more correlation values between the known signal sequences of the cell and corresponding known signal sequences of one or more other cells of the one or more first cells, a comparator adapted to compare each of the one or more correlation values to one or more correlation value thresholds, and an election unit adapted to perform the selection for channel estimation based on the comparison.

A fourth aspect is a wireless communication device comprising the arrangement of the third aspect.

In some embodiments, the third and fourth aspects may additionally have features identical with or corresponding to any of the various features as explained above for the first aspect.

An advantage of some embodiments is that channel estimation for interference cancellation in connection with cell search may be more accurately performed. This, of course, leads to more accurate interference cancellation which in turn results in a better possibility to detect low power cells in presence of other high power cells.

Another advantage of some embodiments is that the result of the channel estimation is robust and is not dependent on the particular conditions with regard to known signal sequences.

Yet a further advantage of some embodiments is that the suggested approach is simple and introduces very little latency. Thus, a low power cell may be found reasonably fast.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
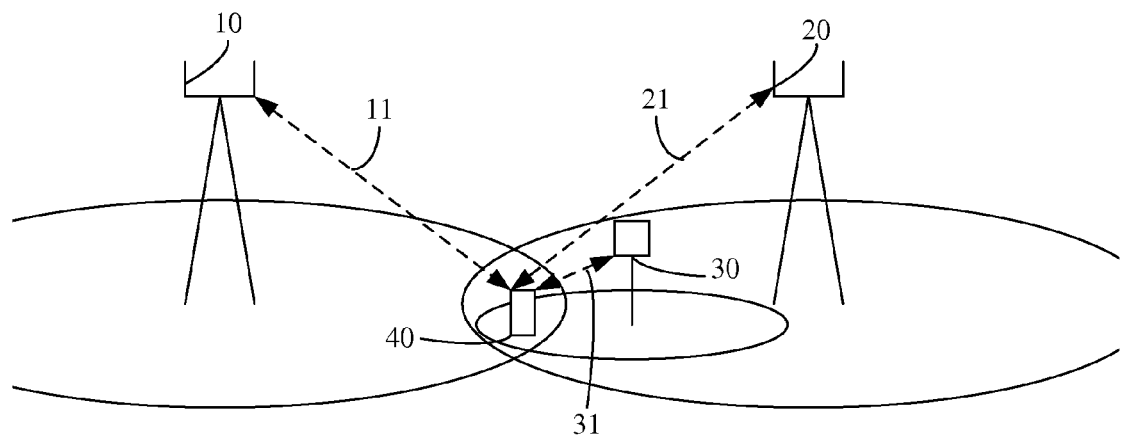
FIG. 1 is a schematic drawing illustrating an example heterogeneous network deployment.

In the following, embodiments will be described where it is determined which of a first and second known signal sequence of a strong cell is to be used for channel estimation for that cell. The channel estimation may be used for interference cancellation of at least one of the first and second known signal sequence, and then a weaker cell may be detected in the interference cancelled signal. Embodiments presented herein may be particularly suitable for heterogeneous networks.

The determination of which sequence to use for channel estimation is based on the first and second known signal sequences. For example, correlation values for the sequences may be used to select the sequence that yields the most accurate channel estimation.

Embodiments will be described herein with reference to UMTS LTE terminology. For example, the first and second known signal sequences will be exemplified by primary and secondary synchronization signals (PSS and SSS respectively), and the cell identity will be exemplified by physical cell identity (PCI). This is mainly for illustrative purposes and is no way intended to be limiting.

Each cell in an example heterogeneous network typically has an assigned PSS and an assigned SSS that together defines the PCI of that cell. The assigned PSS is one of 3 possible sequences. The assigned SSS is built up by two sub-sequences and there are 168 possible SSS combinations. Depending on the cell planning, neighboring cells (in the same or different layers) may have identical (or highly correlated) PSS, SSS and/or SSS sub-sequences. When two cells have identical or correlated PSS it is not beneficial to use PSS in the channel estimation for interference cancellation (and vice versa) since the channel estimation runs a risk of being less accurate due to interference from the neighboring cell. Hence, when the neighboring cells have certain combinations of PSS or SSS or PCI, the cell search in relation to weaker cells may not be improved to an acceptable level by introducing the interference cancellation on these premises.

In embodiments of the invention, a dynamic approach is taken where PSS, SSS or a combination of PSS and SSS may be used for channel estimation. The selection may be based on a comparison of the correlation between PSS:s for detected neighboring cells and the correlation between SSS:s for detected neighboring cells. The sequence having the lowest correlation may be chosen for channel estimation.

In one implementation, correlation values for all pairs of PSS:s and all pairs of SSS:s are determined and a sequence selection is determined for each possibility of two detected neighboring cells. That is, PSS and SSS for the two neighboring cells (or equivalently PCI for the two neighboring cells) is input to the selection algorithm and the output is a choice of one of PSS, SSS and a combination of PSS and SSS. The selection may be made in real time (and may e.g. be dynamic) or the sequence for each possible pair may be pre-selected.

If the cell to be interference cancelled has more than one strong detected neighbor, the selection may be based on the pair including the cell to be interference cancelled and its strongest detected neighbor. Alternatively, a first selection of PSS, SSS or a combination of PSS and SSS may be made for each pair including the cell to be interference cancelled, and a final selection may be based on a combination (e.g. a linear combination) of the first selections.

Figure 2:
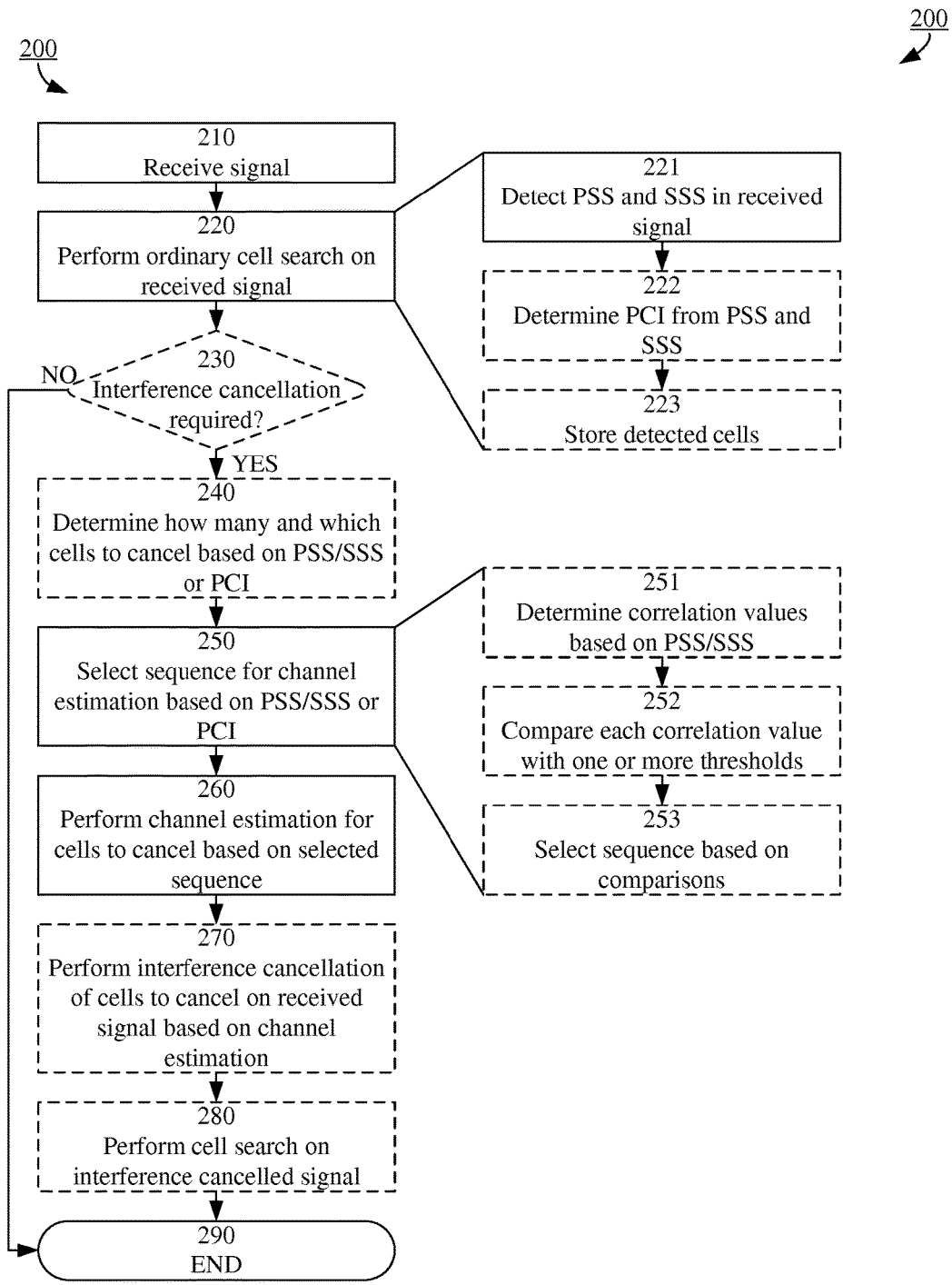
FIG. 2 is a flowchart illustrating example method steps according to some embodiments.

FIG. 2 illustrate an example method 200 according to some embodiments of performing channel estimation for interference cancellation in connection to cell search in heterogeneous networks.

The method starts in step 210 where a signal comprising PSS and SSS for a number of cells is received. In step 220, cell search is performed according to any suitable known or future method and a number of strong cells are detected. The cell search may, for example, comprise detecting PSS and SSS of the strong cells in the received signal as illustrated by 221, determining PCI from the detected PSS and SSS as illustrated by 222, and storing information (e.g. signal strength indicators and/or PCI and/or PSS and SSS) regarding the detected cells as illustrated by 223.

Then it may be determined, in step 230, whether or not interference cancellation is required (e.g. whether or not it is plausible that one or more weaker cells are buried in the interference from the stronger cells). This determination may simply comprise determining that the wireless communication device performing the method has a UE capability according to which interference cancellation should always be applied. Alternatively, the determination may comprise receiving an indication from the network that interference cancellation is required. The indication may be an explicit indication signaled by the network or it may be an implicit indication, such as receiving particular measurement pattern configuration (e.g. a restricted measurement pattern, for example, an almost blank sub-frame pattern) indication from a serving node of a heterogeneous network. If interference cancellation is not required (NO-path out of 230), the method proceeds to step 290 where the cell search is complete.

If interference cancellation is required (YES-path out of 230), the method proceeds to optional step 240 where it is determined how many and which of the detected cells should be subject to interference cancellation. This determination may, for example, be based on SSS and PSS (or equivalently PCI) of the detected cells and/or on a signal strength value of the detected cells. For example, it may be determined that the strongest cell(s) should be cancelled or that the cells with the lowest correlation of PSS/SSS to other cells should be cancelled.

Once it is determined which cells should be cancelled, steps 250-270 are performed for each of those cells.

In step 250, a selection is made regarding which sequence to use for channel estimation based on SSS and PSS (or equivalently PCI) of the detected cells and possibly also on a signal strength value of the detected cells. PSS, SSS or a combination of PSS and SSS may be chosen for channel estimation.

In some embodiments, either PSS or SSS is selected. For example, if there are two detected cells and the (normalized) correlation between PSS of the two cells is higher than the (normalized) correlations between SSS of the two cells, then SSS may be selected for channel estimation and vice versa. If there are three or more detected cells and a first cell is to be cancelled, the above process may be applied to the pair comprising the first cell and the strongest cells among the other detected cells.

In some embodiments, a combination of PSS and SSS may be selected. This may be useful with reference to the above example if the (normalized) correlation between PSS of the two cells is almost equal to the (normalized) correlations between SSS of the two cells. Furthermore, if there are three or more detected cells, a first cell is to be cancelled and the above process is applied to all pairs comprising the first cell, then there is a probability that the different pairs indicates different selections of PSS and SSS. A weighted combination (where the weighting factors may, for example, correspond to the signal strengths of the respective cells) may be applied in such situations.

When a combination of PSS and SSS is selected the channel estimation may, for example, be expressed as $b_1 \hat{H}_{PSS} + b_2 \hat{H}_{SSS}$, where $b_1$ and $b_2$ are non-negative weighting factors. In some embodiments, the weighting factors may be larger than zero and smaller than one. In some embodiments, a sum of the weighting factors may be equal to one. In other embodiments, a sum of the weighting factors may have any positive value. According to some embodiments $b_1 = a$ and $b_2 = 1 - a$, where $0 < a < 1$.

The weighting factors may be selected to minimize a correlation value between the cell to be cancelled and the interfering cell(s). For example, a mean square error of the channel estimation may be aimed at.

The weighting factors $b_1$ and $b_2$ may be scalars or vectors with different vector elements for different sub-carriers or groups of sub-carriers. When the weighting factors are vectors lacking elements for one or more sub-carriers, interpolation may be applied to accommodate all sub-carriers.

The selection in step 250 of which sequence to use for channel estimation may, for example, comprise determining correlation values for PSS and SSS of the cell to be cancelled compared with one or more other detected cells as illustrated in step 251. In step 252, the determined correlation values may be compared to one or more correlation value thresholds and the sequence selection may be performed based on the comparison as illustrated in step 253. The correlation value thresholds may be absolute thresholds or may comprise other determined correlation values (e.g. PSS correlation compared to SSS correlation).

The above steps 251-253 may be performed during operation of the wireless communication device. Alternatively, they may be performed once in connection to design, production or configuration of the wireless communication device and the result may be stored in the form of a look-up table. Such a look-up table may be accessed by PSS/SSS or PCI of the cell to be cancelled and PSS/SSS or PCI (and possibly signal strength) of one or more of the other detected cells to produce a selection of PSS, SSS or a combination of PSS and SSS (typically indicated by a weighting factor).

When the selection of step 250 has been made, the channel estimation is performed based on the sequence selection in step 260 and the channel estimates are used to equalize the channel representing the signal to be cancelled (typically SSS) for the cell and the interference cancellation may be performed thereafter as illustrated by step 270. Typically, the SSS of the cell is cancelled and possibly also the PSS.

When step 270 have been performed for all cells to be cancelled, a new cell search may be performed based on the interference cancelled signal to find any weaker cells present in the received signal as illustrated in step 280. Step 280 may be equal or similar to step 220 and will not be elaborated on in detail.

In some embodiments, steps 240-280 may be repeated for any cells found in step 280. Otherwise, the method proceeds to step 290 where the cell search is complete.

The signal strength value mentioned in connection to steps 240 and 250 may be any suitable signal quality measure (e.g. signal-to-noise ratio (SNR), signal-to-interference ratio (SIR), signal-to-interference-and-noise ratio (SINR), signal strength, reference signal received power (RSRP), reference signal received quality (RSRQ), etc.).

In a mathematical description of the above-described process according to some embodiments, a received PSS and SSS OFDM symbol ($Y_i^{PSS}$ and $Y_i^{SSS}$) for resource element i assuming two strong cells (1 and 2) may be described by:

$$Y_1^{PSS} = H_i * PSS_1(i) + G_i * PSS_2(i) + e_1,$$

$$Y_1^{SSS} = H_i * SSS_1(i) + G_i * SSS_2(i) + e_1,$$

where * represent element-wise multiplication (in the frequency domain), $H_i$ and $G_i$ represent the radio channels for the two cells respectively, and $e_i$ represents noise.

The channel of the cell to be cancelled (assume cell 1 with radio channel $H_i$) may be estimated based on PSS as $\hat{H}_{PSS} = \Sigma_i Y_i * PSS_1^H(i)$ or based on SSS as $\hat{H}_{SSS} = \Sigma_i Y_i * SSS_1^H(i)$ depending on the sequence selection, where $Y_i$ is the received signal and $X^H$ denotes the complex conjugate of X. When the sequence selection results in a combination of PSS and SSS, the channel of the cell to be cancelled may be estimated as $\hat{H} = b_1 \hat{H}_{PSS} + b_2 \hat{H}_{SSS}$ as mentioned before. Typically, the channel may be assumed to be constant over a subset of resource elements.

Then, the channel estimate $\hat{H}$ may be used for estimating the received SSS symbol of the already detected cell 1, and the estimated SSS symbol may be subtracted from the received SSS symbol, to form an interference cancelled signal:

$$Y_{i,IC,1} = Y_i - \hat{H} * SSS_1(i) = G_i * SSS_2(i) + e_i + \epsilon_{i,1},$$

where $\epsilon_i$ corresponds to the estimation error. The process (sequence selection, channel estimation and interference cancellation) may be repeated for all cells to be cancelled (in this case, possibly cell 2) to produce a final interference cancelled signal $Y_{i,IC}$ and then a new cell search may be performed to possibly find one or more low power cells (e.g. a cell 3) that were drowned in the signals from the cancelled cells. The new cell search may, for example, comprise determining whether or not the signal model $Y_{i,IC} = F_i * SSS_3(i) + \epsilon_i$ is probable or not, where $F_i$ represent the radio channel for the cell 3, and $\epsilon_i$ represents noise.

Figure 3:
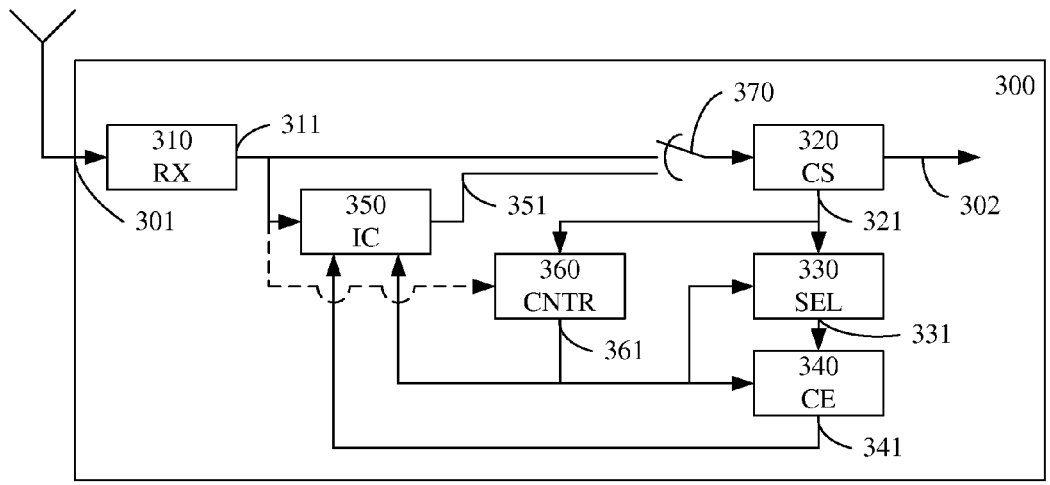
FIG. 3 is a block diagram illustrating an example arrangement according to some embodiments.

FIG. 3 illustrate an arrangement 300 of a wireless communication device according to some embodiments. The arrangement 300 may, for example be adapted to perform the method as described in connection to FIG. 2. The arrangement 300 comprises a receiver (RX) 310, a cell detector or cell search unit (CS) 320, a sequence selector (SEL) 330 and a channel estimator (CE) 340. The arrangement may also comprise an interference canceller (IC) 350 and an interference cancellation controller (CNTR) 360.

The receiver is adapted to receive a signal 301 comprising PSS and SSS for each of one or more first cells (compare with step 210 of FIG. 2), and forward the received signal 311 to the cell search unto 320 and the interference canceller 350 (possibly after suitable processing such as, for example, filtering and analog-to-digital conversion).

The cell search unit 320 is adapted to detect the one or more first cells based on the received signal (compare with step 220 of FIG. 2) and output particulars of the detected cells as illustrated at 302. The cell search unit 320 also forwards specific particulars (e.g. PSS/SSS or PCI, and possibly signal strength values) of the detected cells to the sequence selector 330 at 321.

The sequence selector 330 is adapted to select (for one or more of the detected cells) and output at 331 one of PSS, SSS, and a combination of PSS and SSS for channel estimation based on the specific particulars 321 (compare with step 250 of FIG. 2).

The channel estimator 340 is adapted to perform channel estimation for the one or more of the detected cells based on the signal sequence selection 331 (compare with step 260 of FIG. 2).

The channel estimations 341 may be input to the interference canceller 350 which is adapted to perform interference cancellation on the received signal 311 of at least one of PSS and SSS of the one of the one or more of the detected cells based on the channel estimations 341 to produce an interference cancelled received signal 351 (compare with step 270 of FIG. 2).

The cell search unit 320 may detect one or more second cells based on the interference cancelled received signal 351 (compare with step 280 of FIG. 2). A switch 370 may select either of the received signal 311 and the interference cancelled signal 351 as input to the cell search unit 320.

The interference cancellation controller 360 may be adapted to determine whether or not interference cancellation is required (compare with step 230 of FIG. 2), and control operation of the sequence selector 330, the channel estimator 340 and the interference canceller 350 accordingly via one or more control signals 361. The determination may, for example, be based on signaling from the network (i.e. on the received signal 311) or on the UE category of the wireless communication device.

The interference cancellation controller 360 may, alternatively or additionally, be adapted to determine (based on the specific particulars 321) how many and which cells should be cancelled (compare with step 240 of FIG. 2), and control operation of the sequence selector 330, the channel estimator 340 and the interference canceller 350 accordingly via the one or more control signals 361.

Figure 4A:
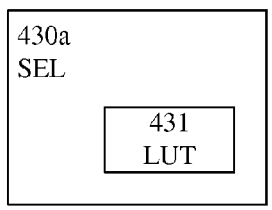
FIG. 4A is a block diagram illustrating details of an example arrangement according to some embodiments.

As illustrated schematically in FIG. 4A, the sequence selector 330, 430a may comprise a look-up table 431, for example implemented as a mapper and a memory providing the look-up table function.

Figure 4B:
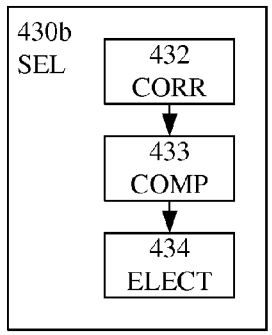
FIG. 4B is a block diagram illustrating details of an example arrangement according to some embodiments.

Alternatively, as illustrated schematically in FIG. 4B, the sequence selector 330, 430b may comprise a correlator 432 adapted to determine one or more correlation values between PSS/SSS of the cell to be cancelled and PSS/SSS of one or more other detected cells, a comparator 433 adapted to compare each of the one or more correlation values to one or more correlation value thresholds, and an election unit 434 adapted to perform the selection for channel estimation based on the comparison.

By application of embodiments cells with very low signal strength (e.g. low SNR) may be detected efficiently, which provides for fast detection of e.g. pico and femto cells in hetnet (heterogeneous network) scenarios.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, a USB-stick, a plug-in card, an embedded drive, or a mobile gaming device.

Figure 5:
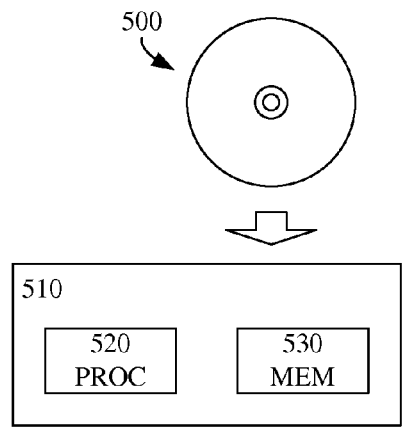
FIG. 5 is a schematic drawing illustrating a computer readable medium according to some embodiments.

According to some embodiments, a computer program product comprises a computer readable medium such as, for example, a diskette or a CD-ROM as illustrated by 500 in FIG. 5. The computer readable medium 500 may have stored thereon a computer program comprising program instructions. The computer program may be loadable into a data-processing unit 520, which may, for example, be comprised in a mobile terminal 510. When loaded into the data-processing unit 520, the computer program may be stored in a memory 530 associated with or integral to the data-processing unit 530. According to some embodiments, the computer program may, when loaded into and run by the data-processing unit 520, cause the data-processing unit to execute method steps according to, for example, the method 200 of FIG. 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence. For example, the determination of whether or not to perform interference cancellation may be performed before step 220 (and even before 210) of FIG. 2, and the steps 250-270 of FIG. 2 may be performed in parallel for the cells to be cancelled or in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. For example, the controller 360 of FIG. 3 may be implemented as two or more functional units, and/or the interference canceller 350 of FIG. 3 may include the channel estimator 340.

Hence, it should be understood that the details of the described embodiments are merely for illustrative purpose and by no means limiting. Instead, all variations that fall within the range of the claims are intended to be embraced therein.

The invention claimed is:

1. A method of a wireless communication device for a cellular communication system, the method comprising:
receiving a signal comprising, for each of one or more first cells of the cellular communication system, a first known signal sequence and a second known signal sequence;

detecting, based on the received signal, the first and
second known signal sequences of the each of the one
or more first cells;
determining a cell identity of at least one of the one or
more first cells based on the respective detected first
and second known signal sequences;
for the at least one of the one or more first cells and based
on the respective detected first and second known
signal sequences of the one or more first cells, selecting
for channel estimation one of:
the respective first known signal sequence;
the respective second known signal sequence; and
a combination of the respective first and second known
signal sequences; and
performing the channel estimation of the at least one of
the one or more first cells based on the signal sequence
selection, wherein the signal sequence selection for the
channel estimation is performed based on the determined cell identity.

2. The method of claim 1 further comprising performing interference cancellation, on the received signal, of at least one of the respective first and second known signal sequences of the at least one of the one or more first cells based on the channel estimation to produce an interference cancelled received signal.

3. The method of claim 2 further comprising detecting, based on the interference cancelled received signal, one or more second cells of the cellular communication system.

4. The method of claim 2, further comprising determining that the interference cancellation is required prior to the performing interference cancellation.

5. The method of claim 4 wherein the determination that the interference cancellation is required is based on configuration signaling from a network node of the cellular communication system.

6. The method of claim 2, further comprising determining, based on the detected first and second known signal sequences of the one or more first cells:
how many cells the at least one of the one or more first cells comprises; and
which cells the at least one of the one or more first cells comprises.

7. The method of claim 1 wherein performing the channel estimation of the at least one of the one or more first cells based on the combination of the first and second known signal sequences comprises determining the channel estimation as a sum of a channel estimation based on the first known signal sequence multiplied with a first weighting factor and a channel estimation of the second known signal sequence multiplied with a second weighting factor, wherein the first and second weighting factors are larger than zero.

8. The method of claim 1, wherein selecting one of the first known signal sequence, the second known signal sequence, and a combination of the first and second known signal sequences for channel estimation comprises, for each cell of the at least one of the one or more first cells:
determining one or more correlation values between the known signal sequences of the cell and corresponding known signal sequences of one or more other cells of the one or more first cells;
comparing each of the one or more correlation values to one or more correlation value thresholds; and
performing the selection for channel estimation based on the comparison.

9. The method of claim 1, wherein the selection for channel estimation is further based on a signal strength of the at least one of the one or more first cells.

10. A nontransitory computer readable medium having thereon a computer program comprising program instructions, the computer program being loadable into a processor and adapted to cause execution of a method when the computer program is run by the processor, where the method is of a wireless communication device for a cellular communication system, the method comprising:
receiving a signal comprising, for each of one or more first cells of the cellular communication system, a first known signal sequence and a second known signal sequence;
detecting, based on the received signal, the first and second known signal sequences of the each of the one or more first cells;
determining a cell identity of at least one of the one or more first cells based on the respective detected first and second known signal sequences;
for the at least one of the one or more first cells and based on the respective detected first and second known signal sequences of the one or more first cells, selecting for channel estimation one of:
the respective first known signal sequence;
the respective second known signal sequence; and
a combination of the respective first and second known signal sequences; and
performing the channel estimation of the at least one of the one or more first cells based on the signal sequence selection, wherein the signal sequence selection for the channel estimation is performed based on the determined cell identity.

11. An apparatus of a wireless communication device for a cellular communication system, the apparatus comprising:
a receiver adapted to receive a signal comprising, for each of one or more first cells of the cellular communication system, a first known signal sequence and a second known signal sequence;
a cell detector adapted to detect, based on the received signal, the first and second known signal sequences of the each of the one or more first cells and forwarding a cell identity of at least one of the one or more first cells determined based on the respective detected first and second known signal sequences;
a sequence selector adapted to, for the at least one of the one or more first cells and based on the respective detected first and second known signal sequences of the one or more first cells, select for channel estimation one of:
the respective first known signal sequence;
the respective second known signal sequence; and
a combination of the respective first and second known signal sequences; and
a channel estimator adapted to perform the channel estimation of the at least one of the one or more first cells based on the signal sequence selection, wherein the signal sequence selection for the channel estimation is performed based on the determined cell identity.

12. The apparatus of claim 11 further comprising an interference canceller adapted to perform interference cancellation, on the received signal, of at least one of the respective first and second known signal sequences of the at least one of the one or more first cells based on the channel estimation to produce an interference cancelled received signal.

13. The apparatus of claim 12 wherein the cell detector is further adapted to detect, based on the interference cancelled received signal, one or more second cells of the cellular communication system.

14. The apparatus of claim 12, further comprising an interference cancellation controller adapted to determine at least one of:
  that interference cancellation is required; and
  based on the detected first and second known signal sequences of the one or more first cells how many cells the at least one of the one or more first cells comprises and which cells the at least one of the one or more first cells comprises.

15. The apparatus of claim 11, wherein the sequence selector comprises:
  a correlator adapted to determine, for each cell of the at least one of the one or more first cells, one or more correlation values between the known signal sequences of the cell and corresponding known signal sequences of one or more other cells of the one or more first cells;
  a comparator adapted to compare each of the one or more correlation values to one or more correlation value thresholds; and
  an elector adapted to perform the selection for channel estimation based on the comparison.

16. A wireless communication device comprising the apparatus of claim 11.

\* \* \* \* \*